United States Patent [19]

Schrenk et al.

[11] Patent Number: 5,103,337
[45] Date of Patent: Apr. 7, 1992

[54] INFRARED REFLECTIVE OPTICAL INTERFERENCE FILM

[75] Inventors: Walter J. Schrenk; John A. Wheatley, both of Midland, Mich.

[73] Assignee: The Dow Chemical Company, Midland, Mich.

[21] Appl. No.: 557,262

[22] Filed: Jul. 24, 1990

[51] Int. Cl.$^5$ .............................. G02B 5/28
[52] U.S. Cl. .................. 359/359; 359/589; 359/588
[58] Field of Search ............... 350/1.6, 164, 166, 1.1

[56] References Cited

U.S. PATENT DOCUMENTS

| Re. 31,780 | 12/1984 | Cooper et al. | 350/166 X |
|---|---|---|---|
| 3,247,392 | 5/1961 | Thelen | 250/226 |
| 3,432,225 | 3/1969 | Rock | 350/164 |
| 3,499,697 | 3/1970 | Edwards | 350/1.6 |
| 3,551,017 | 12/1970 | Iwasaki et al. | 350/1.6 |
| 3,557,265 | 1/1971 | Chisholm et al. | 425/505 X |
| 3,687,589 | 8/1972 | Schrenk | 425/131.1 |
| 3,711,176 | 1/1973 | Alfrey et al. | 350/166 |
| 3,759,647 | 9/1973 | Schrenk et al. | 425/133.5 |
| 3,773,882 | 11/1973 | Schrenk et al. | 264/349 X |
| 3,884,606 | 5/1975 | Schrenk | 425/133.5 |
| 4,229,066 | 10/1980 | Rancourt et al. | 350/1.6 |
| 4,971,843 | 11/1990 | Michelotti et al. | 428/34 |

OTHER PUBLICATIONS

Walter J. Schrenk and Turner Alfrey, Jr. "Coextruding Multilayer Blown Film-Part 1", *SPE Journal*, Jun. 1973, vol. 29.
Walter J. Schrenk and Turner Alfrey, Jr., "Coextruding Multilayer Blown Film-Part 2", *SPE Journal*, Jul. 1973; vol. 29.
Schrenk and Alfrey, *Polymer Blends*, Eds. Paul & Newman Academic Press (1978) Chpt. 15.
Radford et al., "Reflectivity of Iridescent Coextruded Multilayered Plastic Films", *Polymer Engineering and Science*, vol. 13, No. 3, May 1973, pp. 216-221.

*Primary Examiner*—Bruce Y. Arnold
*Assistant Examiner*—David R. Parsons

[57] ABSTRACT

The present invention provides an optical interference film, made of multiple layers of polymers, which reflects wavelengths of light in the infrared region of the spectrum while being substantially transparent to wavelengths of light in the visible spectrum. The optical interference film includes multiple alternating layers of at least first, second, and third diverse, substantially transparent polymeric materials A, B, and C, with the layers being of an optical thickness of between about 0.09 and 0.45 micrometers. Each of the polymeric materials has a different index of refraction, $n_i$, and the refractive index of the second polymeric material is intermediate the respective refractive indices of the first and third polymeric materials.

20 Claims, 1 Drawing Sheet

INFRARED REFLECTIVE OPTICAL INTERFERENCE FILM

BACKGROUND OF THE INVENTION

The present invention relates to multilayer optical interference films, and more particularly to optical interference films which reflect light in the infrared region of the spectrum while transmitting substantially all light in the visible spectrum.

Coextruded multilayer films have been made which comprise multiple alternating layers of two polymers with individual layer thicknesses of 100 nanometers or less. Such multilayer films are described, for example, in Alfrey et al, U.S. Pat. No. 3,711,176. When polymers are selected to have a sufficient mismatch in refractive indices, these multilayer films cause constructive interference of light. This results in the film transmitting certain wavelengths of light through the film while reflecting other wavelengths. The multilayer films can be fabricated from relatively inexpensive and commercially available polymer resins having the desired refractive index differences. The films have the further advantage in that they may be shaped or formed into other objects.

The reflection and transmission spectra for a particular film are primarily dependent on the optical thickness of the individual layers, where optical thickness is defined as the product of the actual thickness of the layer times its refractive index. Films can be designed to reflect infrared, visible, or ultraviolet wavelengths of light depending on the optical thickness of the layers. When designed to reflect infrared wavelengths of light, such prior art films also exhibit higher order reflections in the visible range, resulting in an iridescent appearance for the films. The films produced in accordance with the above mentioned Alfrey patent exhibit iridescence and changing colors as the angle of incident light on the film is changed.

For some applications, while reflection of infrared wavelengths is desirable, higher order reflections of visible light are not. For example, infrared reflecting films can be laminated to glass in buildings and automobiles to reduce air conditioning loads. The films may also be laminated to other substantially transparent plastic materials to reflect infrared wavelengths. However, the films must be substantially transparent to visible light so that the vision of those looking through the glass or plastic is not impaired.

It is possible to suppress some higher order reflections by proper selection of the optical thickness ratio in two component multilayer films. See, Radford et al, *Reflectivity of Iridescent Coextruded Multilayered Plastic Films*, Polymer Engineering and Science, vol. 13, No. 3, May 1973. However, it is not possible to suppress two successive higher order reflections with two component films.

Other workers have designed optical coatings comprising layers of three or more materials which are able to suppress certain higher order reflections. For example, Thelen, U.S. Pat. No. 3,247,392, describes an optical coating used as a band pass filter reflecting in the infrared and ultraviolet regions of the spectrum. The coating is taught to suppress second and third order reflectance bands. However, the materials used in the fabrication of the coating are metal oxide and halide dielectric materials which must be deposited in separate processing steps using expensive vacuum deposition techniques. Also, once deposited, the coatings and the substrates to which they are adhered cannot be further shaped or formed. Further, the coatings are subject to chipping, scratching, and/or corrosion and must be protected. Finally, because vacuum deposition techniques must be used, it is difficult to fabricate coatings which cover large surface areas.

Rock, U.S. Pat. No. 3,432,225, teaches a four layer antireflection coating which utilizes specified thicknesses of the first two layers of the coating to synthesize a layer having an effective index of refraction which is intermediate that of the first two layers. Again, Rock uses metal halides, oxides, sulfides, and selenides which are deposited in separate processing steps using vacuum deposition techniques.

Likewise, Rancourt et al, U.S. Pat. No. 4,229,066, teaches a visible light transmitting, infrared reflecting multilayer coating utilizing metal halides sulfides, and selenides. The materials have either a high or low index of refraction and are deposited in separate steps using vacuum deposition techniques. Neither of the coatings of Rock or Rancourt et al can be further shaped or formed after deposition.

Accordingly, the need still exists in this art for an optical interference film which can suppress a plurality of or multiple successive higher order reflections and yet be fabricated and then further shaped or post-formed using relatively inexpensive materials.

SUMMARY OF THE INVENTION

The present invention meets that need by providing an optical interference film made of multiple layers of diverse polymers which reflects wavelengths of light in the infrared region of the spectrum while being substantially transparent to wavelengths of light in the visible spectrum. By the term "diverse" we mean that the polymeric materials need not differ in any respect except in terms of refractive index. Thus, while adjacent layers may be chemically diverse, if such materials have the same refractive index, then for purposes of the present invention they are not "diverse". The number of layers may vary within a wide range of from about 50 to over 1000 layers.

In accordance with one embodiment of the invention, an optical interference film comprising multiple alternating layers of at least first, second, and third diverse, substantially transparent polymeric materials A, B, and C, is provided with the layers being of an optical thickness of between about 0.09 and 0.45 micrometers and each of the polymeric materials having a different index of refraction, $n_i$. The optical thickness of a given layer may be defined as the physical thickness, d, times the refractive index, $n_i$, of the polymeric material.

Additionally, the refractive index of the second polymeric material is intermediate the respective refractive indices of the first and third polymeric materials. In an embodiment of the invention having a layer repeating unit of ABCB and where multiple successive higher order reflections are suppressed, the optical thickness ratio of first material A, $f_A$, is ⅓, the optical thickness ratio of second material B, $f_B$, is 1/6, the optical thickness ratio of third material C, $f_C$, is ⅓, and $$n_B = \sqrt{n_A n_C}$$

where the optical thickness ratio, $f_i$, is defined as:

$$f_i = \frac{n_i d_i}{\sum_{i=1}^{m} (n_i d_i)}$$

and m is the number of layers in the optical repeat unit, $n_i$ is the refractive index of polymers i, and $d_i$ is the layer thickness of polymers i. This particular embodiment of the invention produces a film in which reflections for the second, third, and fourth order wavelengths will be suppressed.

To produce a film which reflects a broad bandwidth of wavelengths in the solar infrared range (e.g., reflection at from about 0.7 to 2.0 micrometers), a layer thickness gradient may be introduced across the thickness of the film. Thus, in one embodiment of the invention, the layer thicknesses will increase monotonically across the thickness of the film.

In a preferred embodiment of the invention, the polymeric materials form a repeating unit ABCB. To insure that the second polymeric material has an index of refraction intermediate that of the first and third polymers, any or all of the first, second, or third polymeric materials may be a copolymer or miscible blend of polymers. For example, the second polymeric material may be a copolymer or miscible blend of the first and third polymeric materials. By varying the amounts of first and third polymers in the copolymer or blend, the second polymeric material can be synthesized to have the requisite index of refraction. It will also be apparent to those skilled in this art that the refractive index, n, of any of the polymeric materials may be adjusted in this manner to synthesize the desired refractive index.

Further, it is preferred that the first polymeric material differs in refractive index from the second polymeric material by at least about 0.03, the second polymeric material differs in refractive index from the third polymeric material by at least about 0.03. In accordance with one of the preferred embodiments, the first polymeric material is polystyrene, the second polymeric material is a copolymer of styrene and methyl methacrylate, and the third polymeric material is polymethyl methacrylate. The optical interference film of the present invention reflects wavelengths of light in the infrared region of the spectrum while suppressing two or more successive higher order reflections in the visible range of the spectrum.

The optical interference films of the present invention may find use in areas where infrared reflective properties are desired. For example, the films of the present invention may be laminated to glass used in buildings and automobiles to reflect infrared radiation, thus lowering the heating loads. Further, the films may also be laminated to other substantially transparent plastics to provide infrared reflective properties. For example, windshields and canopies on certain aircraft are fabricated from tough polymeric resins. Laminating the optical interference film of the present invention to, or incorporating the film into, such polymeric resins would provide protection from infrared radiation while still providing substantial transparency to light in the visible region of the spectrum. The films themselves, as well as the plastics to which they are laminated may be shaped or post-formed into a variety of useful objects. Because the films are substantially transparent to light in the visible region of the spectrum, substantially no iridescence or other undesirable color effects are present.

Accordingly, it is an object of the present invention to provide an infrared reflective optical interference film which can suppress a plurality of or multiple successive higher order visible reflections and yet be fabricated using relatively inexpensive materials. Further it is an object of the present invention to provide an optical interference film which can itself be formed into a variety of useful shapes or which can be laminated to other substrates which can be shaped or post-formed. These, and other objects and advantages of the present invention, will become apparent from the following detailed description, the accompanying drawings and the appended claims.

DETAILED DESCRIPTION OF THE PREFERRED EMBODIMENTS

Figure 1:
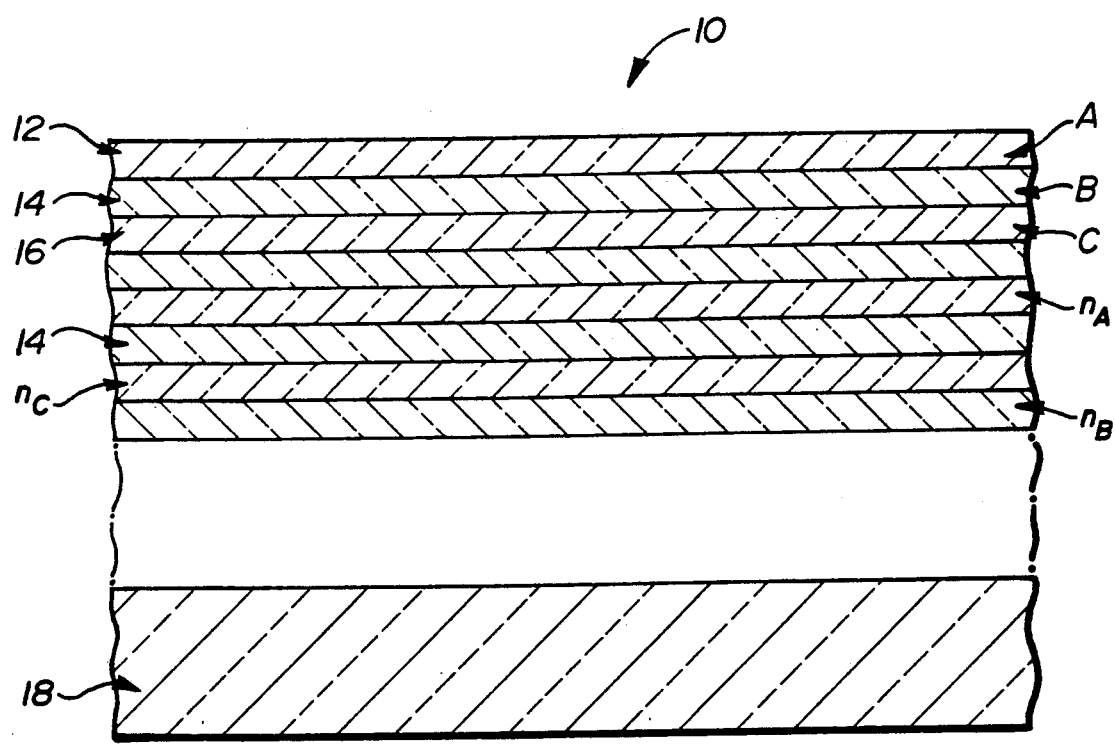
FIG. 1 is a schematic cross-section of a preferred three component multilayer polymeric optical interference film of the present invention laminated to a transparent substrate, where the first polymer, A, has a refractive index, $n_A$, the second polymer, B, has a refractive index, $n_B$, and the third polymer, C, has a refractive index, $n_C$.

The present invention provides improved multilayer optical interference films with a number of desirable properties including infrared reflectivity over a broad bandwidth in the infrared range, substantial transparency to visible light, and the capability of being shaped, or laminated and then shaped, to form a number of useful articles. The optical theory of multiple reflections from layers having differing refractive indices demonstrates the dependency of the effect on both individual layer thickness and refractive index of the material. See, Radford et al, "Reflectivity of Iridescent Coextruded Multilayered Plastic Films", Polymer Engineering and Science 13, 3, pg. 216 (1973). The primary or first order reflected wavelength for a two component multilayer film is given by the equation below.

$$\lambda_I = 2(n_1 d_1 + n_2 d_2)$$

where, $\lambda_I$ is the wavelength of first order reflection in nanometers, $n_1$ and $n_2$ are the refractive indices of the two polymers, and $d_1$ and $d_2$ are the layer thicknesses of the two polymers, also in nanometers.

As can be seen, the first order reflected wavelength is proportional to the sum of the optical thicknesses of the two polymers (where optical thickness, $n_i d_i$, is the product of layer thickness times refractive index). In addition to first order reflections, higher order reflections occur at integer fractions of the first order. The relative intensity of these higher order reflections depends on the ratio of the optical thickness of the polymer components. As taught by Radford et al, by controlling the optical thickness ratios in a two component system, different order reflections may be enhanced while others are suppressed. However, it is not possible to suppress multiple successive higher order reflections in a two component multilayer polymer system.

Thus, a two component multilayer optical interference film designed to reflect strongly in the near infrared region of the spectrum will exhibit unwanted reflectivity in the visual region of the spectrum as well because of such higher order reflections. Such films typically appear to have a range of iridescent colors. However, in accordance with the present invention, a multilayer optical interference film containing an m-layer repeating unit, where m is an integer of four or greater, is provided to suppress unwanted higher order reflections. Such a film includes at least three different polymer materials in its structure. For such an m-layer repeating unit, the first order reflection will occur at a wavelength $\lambda_I$, where:

$$\lambda_I = 2 \sum_{i=1}^{m} (n_i d_i)$$

The Nth order reflection will occur at a wavelength $\lambda_N$, where:

$$\lambda_N = (2/N) \sum_{i=1}^{m} (n_i d_i)$$

The relative intensities of the higher order reflections are controlled by the values of the optical thickness ratios, $f_i$, where:

$$f_1 = \frac{n_1 d_1}{\Sigma(n_i d_i)}$$

$$f_2 = \frac{n_2 d_2}{\Sigma(n_i d_i)}$$

etc, up to m number of repeating units. Because there is more than one optical thickness ratio for this system, the ratios may be adjusted to suppress at least two successive higher order reflections. The practical effect of this is that for optical interference films designed to reflect in the near infrared region of the spectrum, higher order reflections which would ordinarily appear in the visible region of the spectrum and cause the film to exhibit iridescence are suppressed.

In a preferred embodiment of the present invention, the multilayer optical interference film is make up of three diverse substantially transparent polymeric materials, A, B, and C and has a repeating unit of ABCB. The layers are of an optical thickness of between about 0.09 and 0.45 micrometers, and each of the polymeric materials has a different index of refraction, $n_i$.

The preferred three component multilayer optical interference film of the present invention is shown schematically in FIG. 1. The film 10 includes polymeric layers 12, 14, and 16, respectively, of polymers A, B, and C. The preferred repeating unit ABCB is shown, with each of the polymeric materials having its own different refractive index, $n_A$, $n_B$, $n_C$, respectively. The interference film is shown laminated to a substantially transparent substrate 18, such as a polymer or glass.

A preferred relationship of the optical thickness ratios of the polymers produces an optical interference film in which multiple successive higher order reflections are suppressed. In this embodiment, the optical thickness ratio of first material A, $f_A$, is $\frac{1}{3}$, the optical thickness ratio of second material B, $f_B$, is 1/6, the optical thickness of third material C, $f_C$, is $\frac{1}{3}$, and $$n_B = \sqrt{n_A n_C}$$

where the optical thickness, $n_i d_i$, is defined as above. For this embodiment of the invention, there will be an intense reflection at the first order wavelength, while the reflections at the second, third, and fourth order wavelengths will be suppressed.

To produce a film which reflects a broad bandwidth of wavelengths in the solar infrared range (e.g., reflection at from about 0.7 to 2.0 micrometers), a layer thickness gradient may be introduced across the thickness of the film. Thus, in one embodiment of the invention, the layer thicknesses will increase monotonically across the thickness of the film. As can be seen from the above equations, variations in individual layer thickness, d, have a direct effect on the optical properties of the film.

Preferably, for the preferred three component system of the present invention, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials.

Any or all of the polymeric materials may be synthesized to have the desired index of refraction by utilizing a copolymer or miscible blend of polymers. For example, the second polymeric material may be a copolymer or miscible blend of the first and third polymeric materials. By varying the relative amounts of monomers in the copolymer or polymers in the blend, any of the first, second, or third materials can be adjusted so that there is a refractive index relationship where $$n_B = \sqrt{n_A n_C}$$

It will be apparent to those skilled in the art that the optical theories discussed above may be used to calculate desired relationships among materials, refractive indices, and layer thicknesses.

Preferred polymeric materials for use in the practice of the present invention include polymers of styrene, methyl methacrylate, acrylonitrile, polycarbonate, butadiene, polyethylene 2,6 naphthalate, and tetramethylene glycol ether thermoplastic polyurethanes. Copolymers of the above and other polymers are also useful in the practice of the invention and include, for example, copolymers of styrene and methyl methacrylate, styrene and acrylonitrile, and styrene and butadiene. Other copolymers includes copolycarbonates of 4,4-thiodiphenol and bisphenol A and copolymers of gluterimide and methyl methacrylate (KAMAX resins, available from Rohm and Haas)

For example, the first polymeric material may be polystyrene, the second polymeric material may be a copolymer of styrene and methyl methacrylate, and the third polymeric material may be polymethyl methacrylate. Alternatively, miscible blends of polymers may be used to form any of the first, second, or third polymeric materials by mixing them in the correct proportions for the desired refractive index. Examples of suitable miscible blends include polymethyl methacrylate and polyvinylidene fluoride as well as miscible blends of polycarbonates with: blends of polyvinylidene chloride and polyvinyl chloride (SARAN, available from the Dow Chemical Company), polyesters and copolyesters, polycaprolactones, poly (ethylene succinate), poly (ethylene adipate), poly (1,4-butylene adipate), poly 1,4-cyclohexanedimethylene succinate), and a copolymer based on 1,4-cyclohexanedimethylene terephthalate (PCTG).

Other suitable thermoplastic resins which may find use in the practice of the present invention, along with representative refractive indices, include, but are not limited to: perfluoroalkoxy resins (refractive index=1.35), polytetrafluoroethylene (1.35), fluorinated ethylene-propylene copolymers (1.34), silicone resins (1.41), polyvinylidene fluoride (1.42), polychlorotrifluoroethylene (1.42), epoxy resins (1.45), poly(butyl acrylate) (1.46), poly(4-methylpentene-1) (1.46), poly(vinyl acetate) (1.47), ethyl cellulose (1.47), polyformaldehyde (1.48), polyisobutyl methacrylate (1.48), polymethyl acrylate (1.48), polypropyl methacrylate (1.48), polyethyl methacrylate (1.48), polyether block amide (1.49), polymethyl methacrylate (1.49), cellulose acetate (1.49), cellulose propionate (1.49), cellulose acetate butyrate (1.49), cellulose nitrate (1.49), polyvinyl butyral (1.49), polypropylene (1.49), polybutylene (1.50), ionomeric resins such as a copolymer of ethylene and at least one unsaturated monocarboxylic acid known as SURLYN (trademark) (1.51), low density polyethylene (1.51), polyacrylonitrile (1.51), polyisobutylene (1.51), thermoplastic polyesters such as ECDEL (trademark) (1.52), natural rubber (1.52), perbunan (1.52), polybutadiene (1.52), nylon (1.53), polyacrylic imides (1.53), poly(vinyl chloro acetate) (1.54), polyvinyl chloride (1.54), high density polyethylene (1.54), copolymers of methyl methacrylate and styrene (1.54), transparent acrylonitrile-butadiene-styrene terpolymer (1.54), allyl diglycol resin (1.55), blends of polyvinylidene chloride and polyvinyl chloride such as SARAN resins (trademark) (1.55), polyalpha-methyl styrene (1.56), styrene-butadiene latexes such as Dow 512-K (trademark) (1.56), polyurethane (1.56), neoprene (1.56), copolymers of styrene and acrylonitrile such as TYRIL resin (trademark) (1.57), copolymers of styrene and butadiene (1.57), polycarbonate (1.59), other thermoplastic polyesters such as polyethylene terephthalate and polyethylene terephthalate glycol (1.60), polystyrene (1.60), polyimide (1.61), polyvinylidene chloride (1.61), polydichlorostyrene (1.62), polysulfone (1.63), polyether sulfone (1.65), and polyetherimide (1.66). Other polymers, and their respective refractive indices, are reported in J. Brandrup and E. Immergut, Polymer Handbook, Third Edition, pp. VI/451–VI461.

It is preferred that the polymers have compatible rheologies for coextrusion. That is, as a preferred method of forming the multilayer films is the use of coextrusion techniques, the melt viscosities of the polymers must be reasonably matched to prevent layer instability or nonuniformity. The polymers used also should have sufficient interfacial adhesion so that the films will not delaminate.

The multilayer optical interference films of the present invention possess major advantages over prior art processes which use expensive metal and dielectric vapor deposition techniques. The films of the present invention can be tailored to reflect infrared light over a broad bandwidth; they can be readily coextruded and can have large surface areas; and they can be formed and shaped into a variety of useful configurations after coextrusion.

Multilayer bodies in accordance with the present invention are most advantageously prepared by employing a multilayered coextrusion device as described in U.S. Pat. Nos. 3,773,882 and 3,884,606 the disclosures of which are incorporated herein by reference. Such a device provides a method for preparing multilayered, simultaneously extruded thermoplastic materials, each of which are of a substantially uniform layer thickness. Preferably, a series of layer multiplying means as are described in U.S. Pat. No. 3,759,647 the disclosure of which is incorporated herein by reference may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body.

The optical interference films of the present invention find a number of uses. For example, they may find use in areas where infrared reflective properties are desired. The films of the present invention may be laminated to glass used in buildings and automobiles to reflect infrared radiation, thus lowering the heating loads. Further, the films may also be laminated to other substantially transparent plastics to provide infrared reflective properties. For example, windshields and canopies on certain aircraft are fabricated from tough polymeric resins. Laminating the optical interference film of the present invention to, or incorporating the film into, such polymeric resins would provide protection from infrared radiation while still providing substantial transparency to light in the visible region of the spectrum.

The films themselves, as well as the plastics to which they are laminated may be shaped or post-formed into a variety of useful objects. Because the films are substantially transparent to light in the visible region of the spectrum, substantially no iridescence or other undesirable color effects are present.

A number of different profiles may be coextruded in addition to sheets and films of the polymeric materials. By profiles, we mean shaping of the multilayer body 1) in a forming die into sheets, channels, lenticular cross-sections, round or elliptical tubes, and parisons, or 2) outside of a die by a post forming procedure. Use of a tubular extrusion die produces a multilayered pipe. Such tubular dies may also be used to produce parisons which are blow molded into bottles and containers. Because the materials used in the construction of the film may be selected for given desired properties, the final film or article may be flexible or rubbery if elastomeric resins are used.

In order that the invention may be more readily understood, reference is made to the following examples, which are intended to be illustrative of the invention, but are not intended to be limiting in scope.

EXAMPLE 1

Employing apparatus as generally described in U.S. Pat. Nos. 3,773,882 and 3,759,647, a three-component multilayer optical interference film was made which reflected in the infrared region of the spectrum while suppressing second, third, and fourth order reflections in the visible region of the spectrum producing a visually transparent film which reflected solar infrared radiation. The coextruded film comprised the following three polymeric components: component A was a styrene methyl methacrylate copolymer having a refractive index of 1.57 and a density of 1.08 commercially available from the Richardson Polymer Corporation under the designation P-359; component B was a methyl methacrylate styrene copolymer having a refractive index of 1.53 and a density of 1.13 commercially available from the Richardson Polymer Corporation under the designation RPC-440; and component C was polymethyl methacrylate having a refractive index of 1.49 and a density of 1.20 commercially available from Rohm and Haas under the designation VS-100.

Skin layers of polycarbonate were provided on both film surfaces sufficient to avoid surface instabilities and provide mechanical properties. The three component film was coextruded into a 165 layer film having an ABCB repeating unit. The three component feedblock had 42 feed slots for component A, 82 feed slots for component B, and 41 feed slots for component C. Three separate extruders fed the respective polymeric components to the feedblock at rates of 18.8 lb/hr for component A, 19.7 lb/hr for component B, and 21.5 lb/hr for component C. Additionally, 15 lb/hr of polycarbonate was coextruded as skin layers on both surfaces of the film. The draw down of the film was adjusted to exhibit a strong first order reflectance at 1400 nanometers at about 0.9 mil film thickness.

This resulted in a film in which the individual layers of component A were 148.6 nanometers thick, component B were 76.3 nanometers thick, and component C were 156.6 nanometers thick. Thus, the optical thickness ratio of first component A, $f_A$, is $\frac{1}{3}$, the optical thickness ratio of second component B, $f_B$, is 1/6, the optical thickness ratio of third component C, $f_C$, is $\frac{1}{3}$, and $$n_B = \sqrt{n_A n_C}$$

where the optical thickness, $f_i$, is defined as:

$$f_i = \frac{n_i d_i}{\Sigma(n_i d_i)}$$

and $n_i$ is the refractive index of polymers i, and $d_i$ is the layer thickness of polymers i.

The film was found to exhibit a strong first order reflection at a wavelength, $\lambda_I$ of 1400 nanometers in the near infrared region of the spectrum. The second, third, and fourth order reflections were suppressed for this system. Thus, the second order reflection, $\lambda_I/2$, of 700 nanometers in the red range of the visible spectrum, the third order reflection, $\lambda_I/3$ of 467 nanometers in the blue range of the visible spectrum, and the fourth order reflection, $\lambda_I/4$, of 350 nanometers in the long ultraviolet range of the spectrum, were all suppressed.

EXAMPLE 2

A solar infrared reflecting film may be designed to reflect wavelengths of from 0.75 to 2.0 micrometers while being substantially transparent to visible wavelengths (0.4 to 0.7 micrometers). Second, third, and fourth order reflections occurring at wavelength bands of 0.375–1.0 micrometers, 0.25–0.667 micrometers, and 0.188–0.5 micrometers, respectively, are suppressed. A fifth order reflectance for the system is at a wavelength band of 0.15–0.4 micrometers in the ultraviolet range.

A three component film having a polymeric repeat unit of ABCB may be fabricated as in Example 1. The first component, A, is a 75-25 mole % copolymer of 4,4-thiodiphenol and bisphenol A having a refractive index of 1.636. The second component, B, is a copolymer of gluterimide and methyl methacrylate (KAMAX T-260 resin, available from Rohm and Haas), and has a refractive index of 1.54.

The third component, C, must have a refractive index of 1.45 to fulfill the requirement that $$n_B = \sqrt{n_A n_C}$$

A miscible blend of 55% polyvinylidene fluoride (PVDF) and 45% polymethyl methacrylate (PMMA) is used.

Relatively thick skin layers of polycarbonate and/or polymethyl methacrylate are provided on both surfaces of the film. Skin layer thickness is sufficient to avoid instabilities (usually about 10% of total thickness) and/or provide mechanical strength. The choice of polymer used is based on mechanical properties and consideration of the substrate to which the film will be laminated.

A layer thickness gradient of the ABCB repeat unit is introduced through the thickness of the film to provide reflectivity over the range of from 0.75 micrometers (minimum cutoff) to 2.0 micrometers (maximum cutoff). Layer thicknesses of the ABCB repeat unit will vary from $d_A=0.0765$ micrometers, $d_B=0.0405$ micrometers, $d_C=0.086$ micrometers, and $d_B=0.0405$ micrometers for the minimum cutoff at a wavelength of 0.75 micrometers to $d_A=0.202$ micrometers, $d_B=0.108$ micrometers, $d_C=0.230$ micrometers, and $d_B=0.108$ micrometers for the maximum cutoff at a wavelength of 2.0 micrometers. The coextrusion feedblock may be adjusted to provide 842 layers with a 2.67:1 repeat unit layer thickness gradient.

The extrusion rates for polymers A, B, and C are set to provide a repeat unit volumetric composition ratio of 31.4%, 33.2% and 35.4%, respectively. Film thickness is adjusted by the draw down speed to obtain first order reflectance between 0.75 and 2.0 micrometers. Total film thickness is dependent on the amount of skin layer polymer provided and the type of layer thickness gradient employed.

This example illustrates the use of two diverse copolymers and a miscible blend of polymers to adjust refractive indices. A calculated spectrum for a 420 layer film shows cutoffs at 0.74 and 2.0 micrometers, respectively, with an average reflectivity of about 75%. The layer thickness gradient of the optical repeat unit may be obtained by coextruding a monotonically increasing layer thickness or other distribution which provides sufficient reflectivity over the range of from 0.75 to 2.0 micrometers. Alternatively, several films reflecting different portions of this range may be laminated together to produce the same result.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An optical interference film which reflects light in the infrared region of the spectrum while transmitting light in the visible region of the spectrum comprising multiple alternating layers of at least first, second, and third "diverse", substantially transparent polymeric materials A, B, and C, each of said layers being of an optical thickness of between about 0.09 and 0.45 micrometers and each of said polymeric materials having a different index of refraction, $n_i$, and wherein the refractive index of said second polymeric material is intermediate the respective refractive indices of said first and third polymeric materials.

2. The optical interference film of claim 1 in which there is a layer thickness gradient across the thickness of said film.

3. The optical interference film of claim 2 in which said layer thicknesses increase monotonically across the thickness of said film.

4. The optical interference film of claim 1 in which the polymeric materials form a repeating unit ABCB.

5. The optical interference film of claim 1 in which said second polymeric material is a copolymer of said first and third polymeric materials.

6. The optical interference film of claim 1 in which said second polymeric material is a miscible blend of said first and third polymeric materials.

7. The optical interference film of claim 6 in which said first polymeric material is polyvinylidene fluoride, said third polymeric material is polymethyl methacrylate.

8. The optical interference film of claim 6 in which said first polymeric material is a polycarbonate and said third polymeric material is a copolyester based on 1,4-cyclohexanedimethylene terephthalate.

9. The optical interference film of claim 1 in which said first polymeric material is polystyrene, said second polymeric material is a copolymer of styrene and methyl methacrylate, and said third polymeric material is polymethyl methacrylate.

10. The optical interference film of claim 1 in which one of said polymeric materials is a copolymer of thiodiphenol and bisphenol A.

11. The optical interference film of claim 1 in which one of said polymeric materials is polyethylene 2,6 naphthalate.

12. The optical interference film of claim 1 in which one of said polymeric materials is a copolymer of gluterimide and methyl methacrylate.

13. The optical interference film of claim 1 in which the optical thickness ratio of material A, $f_A$, is $\frac{1}{3}$, the optical thickness ratio of material B, $f_B$, is 1/6, the optical thickness ratio of material C, $f_C$, is $\frac{1}{3}$, and $$n_B = \sqrt{n_A n_C}$$

14. The optical interference film of claim 1 in which said first polymeric material differs in refractive index from said second polymeric material by at least about 0.03.

15. The optical interference film of claim 14 in which said second polymeric material differs in refractive index from said third polymeric material by at least about 0.03.

16. A laminate comprising an optical interference film which reflects light in the infrared region of the spectrum while transmitting light in the visible region of the spectrum, including multiple alternating layers of at least first, second, and third diverse, substantially transparent polymeric materials A, B, and C, said layers being of an optical thickness of between about 0.09 and 0.45 micrometers and each of said polymeric materials having a different index of refraction, $n_i$, and wherein the refractive index of said second polymeric material is intermediate the respective refractive indices of said first and third polymeric materials, laminated to a glass substrate.

17. The laminate of claim 16 in which the optical thickness ratio of material A, $f_A$, is $\frac{1}{3}$, the optical thickness ratio of material B, $f_B$, is $\frac{1}{3}$, the optical thickness ratio of material C, $f_C$, is $\frac{1}{3}$, and $$n_B = \sqrt{n_A n_C}$$

18. A laminate comprising an optical interference film which reflects light in the infrared region of the spectrum while transmitting light in the visible region of the spectrum, including multiple alternating layers of at least first, second, and third diverse, substantially transparent polymeric materials A, B, and C, said layers being of an optical thickness of between about 0.09 and 0.45 micrometers and each of said polymeric materials having a different index of refraction, $n_i$, and wherein the refractive index of said second polymeric material is intermediate the respective refractive indices of said first and third polymeric materials, laminated to a polymeric resin substrate.

19. The laminate of claim 18 in which the optical thickness ratio of material A, $f_A$, is $\frac{1}{3}$, the optical thickness ratio of material B, $f_B$, is $\frac{1}{3}$, the optical thickness ratio of material C, $f_C$, is $\frac{1}{3}$, and $$n_B = \sqrt{n_A n_C}$$

20. The laminate of claim 18 in which said laminate is in the form of a profile.

* * * * *

UNITED STATES PATENT AND TRADEMARK OFFICE
CERTIFICATE OF CORRECTION

PATENT NO. : 5,103,337
DATED : April 7, 1992
INVENTOR(S) : Walter J. Schrenk and John A. Wheatley It is certified that error appears in the above-indentified patent and that said Letters Patent is hereby corrected as shown below:

Column 12, line 32, "1/3," should correctly read --1/6,--.

Column 12, line 53, "1/3," should correctly read --1/6,--.

Signed and Sealed this

Seventh Day of September, 1993

*Attest:*

BRUCE LEHMAN

*Attesting Officer*  *Commissioner of Patents and Trademarks*